US010216849B2

(12) United States Patent
Davis et al.

(10) Patent No.: US 10,216,849 B2
(45) Date of Patent: Feb. 26, 2019

(54) PERSONALIZED CONTENT RECOMMENDATIONS

(71) Applicant: Knewton, Inc., New York, NY (US)

(72) Inventors: George B. Davis, Brooklyn, NY (US); John O. Davies, New York, NY (US); David L. Kuntz, Richboro, PA (US)

(73) Assignee: Knewton, Inc., New York, NY (US)

( * ) Notice: Subject to any disclaimer, the term of this patent is extended or adjusted under 35 U.S.C. 154(b) by 509 days.

(21) Appl. No.: 14/469,077

(22) Filed: Aug. 26, 2014

(65) Prior Publication Data
US 2015/0058336 A1    Feb. 26, 2015

Related U.S. Application Data

(60) Provisional application No. 61/869,838, filed on Aug. 26, 2013.

(51) Int. Cl.
*G06F 17/30* (2006.01)

(52) U.S. Cl.
CPC .... *G06F 17/30867* (2013.01); *G06F 17/3053* (2013.01); *G06F 17/30554* (2013.01)

(58) Field of Classification Search
CPC ........... G06F 17/30867; G06F 17/3053; G06F 17/30554
USPC ........................................ 707/723, 732, 748
See application file for complete search history.

(56) References Cited

U.S. PATENT DOCUMENTS

| | | | | |
|---|---|---|---|---|
| 8,572,097 | B1* | 10/2013 | Payne | G06F 17/30663 707/748 |
| 2003/0055991 | A1* | 3/2003 | Krishnapuram | G06F 9/468 709/229 |
| 2003/0182310 | A1* | 9/2003 | Charnock | G06F 17/30716 707/E17.095 |
| 2010/0058377 | A1* | 3/2010 | Grob | H04H 60/31 725/14 |
| 2010/0146077 | A1* | 6/2010 | Davies | G06F 17/30817 709/219 |
| 2010/0251305 | A1* | 9/2010 | Kimble | H04N 7/17318 725/46 |
| 2013/0263001 | A1* | 10/2013 | Doronichev | G06F 21/554 715/719 |
| 2013/0275429 | A1* | 10/2013 | York | G06F 17/30029 707/737 |
| 2014/0101134 | A1* | 4/2014 | Bohrer | G06Q 30/02 707/722 |
| 2014/0164507 | A1* | 6/2014 | Tesch | H04L 51/10 709/204 |
| 2014/0244667 | A1* | 8/2014 | Bararsani | G06F 17/30017 707/751 |

(Continued)

*Primary Examiner* — Phong H Nguyen
(74) *Attorney, Agent, or Firm* — Byrne Poh LLP

(57) ABSTRACT

Methods, systems and computer program products for providing personalized educational content recommendations are disclosed. A computer-implemented method may include receiving information describing a body of content, receiving data describing an interaction of a user with one or more elements of the body of content, receiving a context that includes one or more criteria associated with the body of content, generating a list of modules from the body of content based on the data describing the interaction of the user with the one or more elements of the body of content in view of the context, and providing the generated list of modules to an interested party.

22 Claims, 4 Drawing Sheets

(56) References Cited

U.S. PATENT DOCUMENTS

2015/0049093 A1* 2/2015 Doll .................... G06T 13/80
345/473
2015/0302088 A1* 10/2015 Wu .................. G06F 17/30867
706/11

* cited by examiner

PERSONALIZED CONTENT RECOMMENDATIONS

CROSS-REFERENCE TO RELATED APPLICATION

This application is related to and claims the benefit of U.S. Patent Application No. 61/869,838, filed Aug. 26, 2013, the entirety of which is incorporated herein by reference.

TECHNICAL FIELD

The present disclosure generally relates to data processing and more specifically to generating personalized content recommendations using a computer system.

BACKGROUND

Computer-based learning generally involves the use of electronic media, information, and communication technologies in education. Computer-based learning may include various forms of technology used to facilitate teaching and learning.

SUMMARY

Embodiments generally relate to providing personalized recommendations for content such as education content, recreational content, etc. Such embodiments may, for example, provide personalized recommendations for educational content on a very large scale (e.g., across millions of users with high transaction volumes).

In one embodiment, a computer-implemented method receives information describing a body of content, receives data describing an interaction of a user with one or more elements of the body of content, receives a context that includes one or more criteria associated with the body of content, generates a list of modules from the body of content based on the data describing the interaction of the user with the one or more elements of the body of content in view of the context, and provides the generated list of modules to an interested party.

In another embodiment, a system includes a memory and a processor coupled to the memory to provide personalized recommendations for educational content. The system receives information describing a body of content, receives data describing an interaction of a user with one or more elements of the body of content, receives a context that includes one or more criteria associated with the body of content, generates a list of modules from the body of content based on the data describing the interaction of the user with the one or more elements of the body of content in view of the context, and provides the generated list of modules to an interested party.

In a further embodiment, a computer-readable medium has instructions that, when executed by a processor, cause the processor to perform operations. The instructions include computer-readable program code configured to cause the processor to receive information describing a first body of content, the information describing the first body of content comprising one or more relationships between a module and concept associated with the first body of content, receive data describing an interaction of a user with one or more elements of the first body of content, receive a context that includes one or more criteria associated with the content, generate a list of modules from the first body of content based on the data describing the interaction of the user with one or more elements of the first body of content in view of the context and information pertaining to an interaction of the user with a second body of content, providing the generated list of modules to a party associated with one or more modules from the list of modules, and adjusting the first body of content based on the data describing the interaction of the user with the one or more elements of the first body of content.

Further embodiments, features, and advantages of the disclosure, as well as the structure and operation of the various embodiments of the disclosure are described in detail below with reference to accompanying drawings.

BRIEF DESCRIPTION OF THE DRAWINGS

Various embodiments of the present disclosure will be understood more fully from the detailed description given below and from the accompanying drawings of various embodiments of the disclosure. In the drawings, like reference numbers may indicate identical or functionally similar elements. The drawing in which an element first appears is generally indicated by the left-most digit in the corresponding reference number.

DETAILED DESCRIPTION

Methods, systems and computer program products for providing personalized content recommendations are disclosed. Embodiments of the present disclosure are also directed to providing a scalable adaptive learning environment that acquires information about students and content based on student interactions with the content over time. The content may be received from any source, and the content may be organized in any manner at the source.

The content may be analyzed to identify modules (i.e., a unit, portion, or subset of the content) and learning concepts that are present or are intended to be conveyed through the content. Further analysis may be used to determine the relationships between modules of the content, between concepts identified within or conveyed by the content, and between both the modules and the concepts that are associated with the content. The modules, concepts, and relationships may be represented and described using one or more data structures, such as a graph having nodes (e.g., modules and concepts) and edges (e.g., relationships), as a set of associated tags and attributes, or any combination thereof.

A graph representing content may be referred to as a "course graph." Each course graph may be represented by a standard set of entities, relationships, and terminology that allows any content from any content provider to be described in a consistent way that allows such content to be incorporated into the same adaptive learning framework.

Once a course graph has been created for the content, the properties and attributes of the graph, which may include relationships and coefficients associated with modules and concepts, may be adjusted continually or periodically over time based on student interactions with the content (e.g., the same student or different students). Further, the information about the content may be used in conjunction with student interactions and a context describing educational goals for one or more students to generate personalized or customized learning recommendations as an ordered list of modules. In one example, the ordered list of modules is determined and ranked using on one or more educational scores and/or ratings computed for each module based on a course graph, student events (e.g., those that pertain to student interactions with content), and an educational context.

Figure 1:
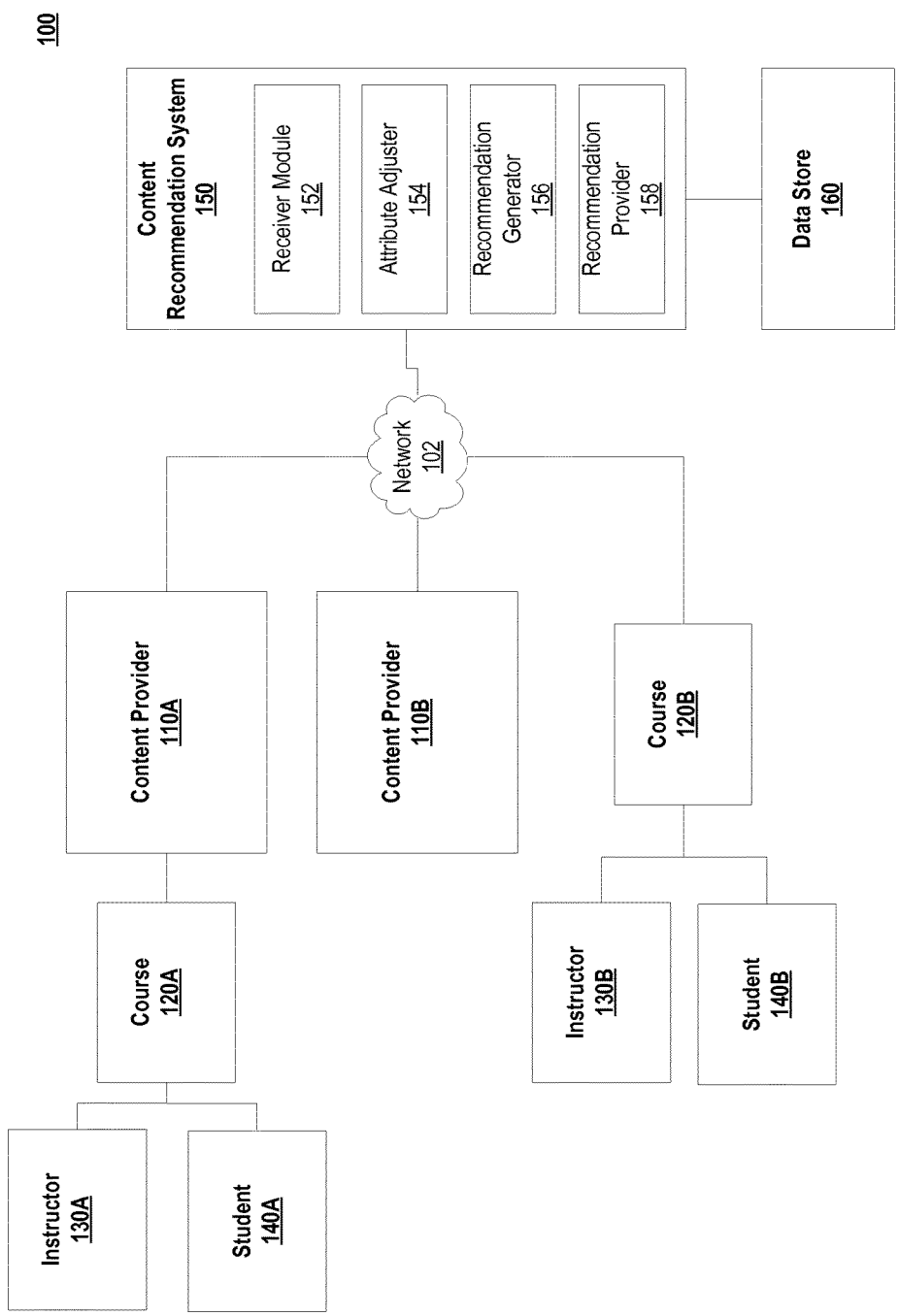
FIG. 1 illustrates a block diagram of a content personalization system architecture, in accordance with various embodiments of the present disclosure.

FIG. 1 illustrates a block diagram of a content personalization system architecture, in accordance with various embodiments of the present disclosure. The content recommendation system architecture 100 includes network 102, content providers 110A and 110B, courses 120A and 120B, instructors 130A and 130B, students 140A and 140B, content recommendation system 150, and data store 160. The content recommendation system architecture 100 includes one or more computer systems connected to a network 102. The network 102 may be, for example, a public network (e.g., the Internet), a private network (e.g., a local area network (LAN) or wide area network (WAN)), or a combination thereof.

The computer systems may include, for example, personal computers (PC), laptops, mobile phones, gaming systems, tablet computers, or any other computing device. The computer systems may run an operating system (OS) that manages hardware and software. The computer systems also may include one or more server machines. A server machine may be a virtual machine, a cloud computing resource, rackmount server, a router computer, a personal computer, a portable digital assistant, a mobile phone, a laptop computer, a tablet computer, a computer gaming device, a camera, a video camera, a netbook, a desktop computer, a media center, or any combination thereof.

The content recommendation system architecture 100 also may include a persistent data store 160, such as a file server or network storage, capable of storing various types of data. In some embodiments, the data store might include one or more other types of persistent storage such as one or more object-oriented databases, relational databases, graph databases, in-memory databases, and so forth.

Content providers 110A, 110B are generally entities that create, manage and/or distribute content. Content providers 110A, 110B may manage and distribute their own content or content that has been created by or received from one or more other sources. Content may include, for example, text, audio, video, images, etc. Further, content may be aggregated from multiple sources and then distributed as a combined piece of content. In one example, a content provider 110A, 110B may be a publisher of educational content or a technology provider that allows various parties to provide content for their own implementation/another party's implementation of the technology provider's software.

In an example, a content provider 110A publishes a textbook (e.g., electronic or print) that an instructor 130A uses to teach a subject as part of a course 120A, used by a student 140A. The textbook may be organized into a set of chapters and subchapters that are associated with various related topics. The textbook may contain a table of contents to help identify information within the chapters. The textbook also may contain an index to help a user (e.g., a student) find a particular concept within the text. However, such traditional methods of organizing, labeling, and indexing vary across different content and different content providers.

In one example, one or more different pieces of content are each individually analyzed based on a standard framework to identify modules, concepts, and relationships to allow the content to be used within a standardized adaptive learning environment framework. Thus, various content, whether it was designed for adaptivity or not and regardless of the source or provider of the content, may be analyzed and represented in a consistent way. This allows content of various forms and arrangements to be integrated into a common adaptive learning environment where the content and student performance are evaluated and updated periodically. The adaptive learning environment also may determine and provide a custom, personalized list of modules from within the content for a student based on a set of one or more learning requirements and available learning paths within the content (e.g., as provided by a course graph). In one example, a ranked list of content modules may be based on student proficiency in view of criteria defined in a context (e.g., a course completion date, test subject matter, etc.).

In one example, a course graph is defined by a creator or owner of content. A course graph also may be defined by someone other than a creator or owner of the content, such as one or more subject matter experts. In an example, a course graph is defined or refined in whole or in part by crowdsourcing. For example, a course graph may be constructed and modified by a group of various individuals in an online community. The various individuals participating in the crowdsourcing may include, but are not limited to, users having a specific skillset, expertise, credential and/or background that have been pre-screened. In some examples, the various individuals may include any user on the internet.

In one example, a course graph may be defined using an automated process, such as algorithmic or machine learning process that identifies concepts that exist or that may exist in the content. The automated process also may identify relationships that exist or that may exist between identified concepts, as well as between identified concepts and the content itself.

In an example, a content provider 110B provides content that is used or consumed by others. For example, content provider 110B may create or share content with another content provider 110A. Content from a content provider 110B also may be included in a course 120B that an instructor 130B uses to teach a subject to a student 140B. In one example, various content from content providers 110A, 110B may be stored, packaged, and/or distributed using one or more computer systems associated with a content recommendation system 150.

Use of the terms "instructor" and "student" are used generally as non-limiting examples as content may be used to instruct (i.e., for educational purposes) in variety of environments outside of an academic setting, such as in the workplace, for personal enrichment, etc. Thus, for example, a student 140A, 140B may represent any user who consumes content. In addition, an instructor may represent any individual or entity that collects and/or organizes content from one or more content sources for consumption by users.

In certain implementations, content recommendation system 150 includes a receiver module 152, attribute adjuster 154, a recommendation generator 156, and a recommendation provider 158. It should be understood that such an arrangement is exemplary and that in other implementations more or fewer modules/applications (including but not limited to receiver module 152, attribute adjuster 154, recommendation generator 156, and recommendation provider 158) may be employed in providing the various features, functionalities, and operations described herein.

It should also be understood that the various elements, components, and/or devices referenced herein can be combined together or separated into further components, according to a particular implementation. Additionally, in some implementations, various components (e.g., of content recommendation system 150) may run on separate machines.

In an example, content recommendation system 150 is accessed directly by one or more different computing systems, such as a computing system associated with a content provider 110A, 110B. In another example, content recommendation system 150 may be provided as one or more tools, add-ons, or application programming interfaces (APIs).

Receiver module 152 receives various information, which may be internal or external to content recommendation system 150. For example, receiver module 152 may receive information describing a body of educational content, a context representing educational goals or criteria for a student, student events describing student interaction with educational content, a request to provide a personalized content recommendation for a student, etc.

Attribute adjuster 154 analyzes student events that are received. Attribute adjuster 154 may adjust or modify student attributes and/or content properties and attributes over time based on student interactions with the content or related content. In one example, attribute adjuster 154 may analyze relationships associated with a piece of content, and over time, periodically and/or continually adjust the modules, the concepts, and/or the relationships associated with the content. Such adjustment allows an initial estimate of what a piece of content is believed to teach to be modified to reflect actual results based on student interactions with the content.

Recommendation generator 156 generates recommendations for educational content. For example, recommendation generator 156 may receive events describing interactions students have with one or more pieces of educational content. In an example, an event may describe whether a student answered a specific question on a particular exam correctly. Student events also may include information such as a student identifier, a content module that a student interacted with, when an interaction began, when an interaction ended, whether an interaction was complete, and if it was an assessment, how the student performed on that assessment. Such information and other various information may be received as metadata describing a student's interaction with educational content.

In one example, student event information also may include whether one or more learning aids were used in the consumption of the material. For example, student event information may include whether a student relied on a hint or whether the student relied on a help feature, such as an example offered by a content provider. In general, various student event descriptors (e.g., attributes, properties, dimensions, events, relationships, etc.) may be defined, for example, at the content provider level, at the course level, at the content level, etc.

In addition, recommendation generator 156 may receive a course graph describing educational content. The course graph may be, for example, a specific definition of modules, concepts, and relationships of a piece of content. The course graph may define modules, which are references to pieces of content. For example, a single textual paragraph, a chapter, a video, a quiz, a test, a question, or any other unit or subunit of content may be considered a module.

A course graph also may define concepts, which represent a hypothesis or estimation as to the subject matter and/or skills that are intended to be conveyed to a student by a piece of content. Further, a course graph may define or describe one or more relationships between a plurality of modules, between a plurality of concepts, and also between modules and concepts. Several types of course graph relationships may include, but are not limited to, "prerequisite" relationships between concepts, "taught by" relationships between a module and a concept, "assessed by" relationships from concepts to modules, and "containment" relationships between different modules. The relationships in a course graph suffice to enumerate one or more valid learning paths within a body of content and/or across multiple bodies of content. For example, relationships may be used to identify one or more concepts that a student should know before the student consumes another module so that the student is adequately prepared to perform well on the other module.

Recommendation generator 156 also may receive one or more educational contexts, which may be provided, for example, by a content partner and/or instructor. Contexts may provide information about constraints, criteria (timeframe, schedule, remaining time, tested skills, performance thresholds, etc.), and/or educational goals associated with the content. For example, the context may include information indicating that the particular student or group of students is trying to prepare for an exam that tests mastery of specific concepts. The context also may indicate information about types of questions that will be used to test mastery of the concepts. Further, the context may include one or more dates by which specific proficiencies are expected to be acquired, so an amount of available preparation time may be assessed.

Recommendation generator 156 generates a personalized (e.g., ordered, ranked, etc.) list of modules in a body of content based on one or more factors. Recommendation generator 156 may generate the personalized list of modules for a student based on one or more of relationships between concepts and modules for a piece of content as represented in a course graph, proficiency of a student in one or more concepts, attributes and/or preferences of a student, attributes and/or properties of one or more pieces of content, student events associated with one or more pieces of content, and/or one or more pieces of contextual criteria associated with the student and/or content. Recommendation generator 156 may calculate a score or determine a rating reflecting an educational value computed for one or more modules in a piece of content. Recommendation generator 156 also may rank the modules based on the score (e.g., a numerical value) or rating (e.g., an evaluation, assessment, code, etc.). In one embodiment, recommendation generator 156 also may store the generated recommendation for later reference, archival, and/or analysis.

Recommendation provider 158 provides the generated list of recommended educational content to an interested party. In one example, recommendation provider 158 transmits the generated list of recommended educational content to a content provider that serves the content to users. Content provider may, for example, use the educational content recommendation when determining material to present to the student. Content provider also may provide a student with an option to select material based on the recommendation.

In one example, content recommendation system 150 is part of or is integrated with a "continuous" adaptive learning system that continues to refine and fine tune properties and attributes of both students and content over time. For example, unlike traditional learning systems, which may be preconfigured based on a group of test users or on a single pre-test evaluation for an individual student, content recommendation system 150 may receive or observe information about interactions of many different students with content, the effect of which may be combined across many users and different pieces of related content. In an example, content recommendation system 150 continuously refines information about the effectiveness of content and the proficiency of students interacting with that content based on results generated from student-content interactions.

Figure 2:
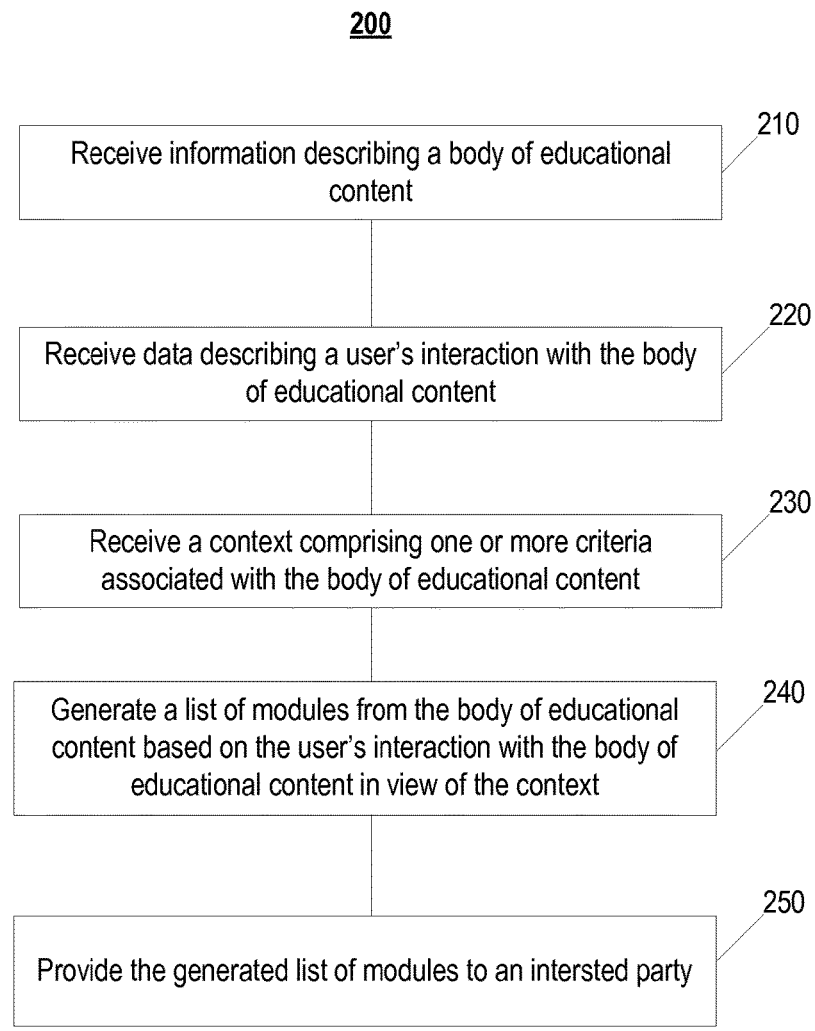
FIG. 2 is a flow diagram illustrating generating personalized recommendations for educational content, according to an embodiment.

FIG. 2 is a flow diagram illustrating generating recommendations for educational content, according to an embodiment. The method 200 may be performed by processing logic that may comprise hardware (circuitry, dedicated logic, programmable logic, microcode, etc.), software (such as instructions run on a general purpose computer system, dedicated machine, or processing device), firmware, or a combination thereof. In one implementation, the method 200 is performed using content recommendation system 150 of FIG. 1 while in some other implementations, one or more blocks or stages of method 200 may be performed by one or more other elements, machines, and/or systems.

For simplicity of explanation, methods are depicted and described as a series of acts, operations, and/or stages. However, acts, operations, and/or stages in accordance with this disclosure can occur in various orders and/or concurrently, and with other acts, operations, and/or stages not presented and described herein. Furthermore, not all illustrated acts, operations, and/or stages may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At stage 210, information describing a body of content is received. In an embodiment, a course graph is received from a content provider 110A, 110B or may be retrieved from a data store 160. In an example, a course graph may be stored or managed using a graph database. A graph database generally refers to a database that can store and manipulate data representing graph structures with nodes, edges and properties. For example, this may include a specialized graph database that is specifically designed to store graph data or a general relational or other type of database capable of storing such data.

In one embodiment, a revisioned graph database is used to store and manage a plurality of course graphs. In one example, the revisioned graph database preserves and maintains a plurality of concurrent and former versions of a course graph. In one example, previous states of a course graph are maintained to allow analysis of actions or events performed on a previous version at an earlier time.

In an example, a first version of a course graph may represent content in a mathematics textbook. A second version of the course graph may represent a first course taught by a first instructor who uses a first set of chapters from the mathematics textbook. A third version of the course graph may represent a second course taught by the first instructor who uses a second set of chapters from the mathematics textbook, which are different from the first set of chapters. A fourth version of the course graph may represent a third course taught by a second instructor who uses a third a set of chapters from the mathematics textbook, which are different from both the first set of chapters and the second set of chapters used by the first instructor. Thus, different versions of the course graph may be maintained to support various instructor preferences and custom course objectives. Additional versions of course graphs may be created and maintained as content providers, instructors, or other parties add, modify, and delete course content over time.

In some embodiments, a course graph for any piece of content may be quite large, and storing multiple versions of each course graph may require massive amounts of storage. In some examples, the revisioned graph database stores only differences between graph versions when a change is made to a graph to reduce an amount of storage needed to provide different versions of a course graph to various parties. Storing only the change (i.e., the event stream) between two different versions of a course graph requires less storage space than copying and maintaining separate full-sized versions of the course graph. In one embodiment, the amount of storage required to maintain multiple versions of the same course graph in memory is reduced by using persistent data structures that allow sharing of course graph nodes and branches in memory. In an embodiment, stage 210 is performed by receiver module 152.

At stage 220, data describing a user's interaction with the body of content is received. In one embodiment, the data describing the user's interaction with content is generated by the student's interaction with the content. For example, a first student interacting with a challenge might ask for a hint before answering, a second student might answer first and then ask for the hint, and a third student may answer without interacting with the hint. In one example, data describing the student's interaction with content is generated. Such data may include, but is not limited to whether a student has answered an item (and possibly a corresponding result or derived features thereof), whether hints were utilized, timing of interactions, type(s) and/or sequences of interaction (e.g., mouse-click, keyboard shortcut, voice command, etc.), content difficulty, content presentation, time of day, contextual information such as classroom status or book section, etc. Such information may be gathered into a variety of datastores, in its original form or into a variety of materialized views or computed statistics, such as rolling frequencies of interaction, time-weighted ratios of correct answers, rolling lists of recently interacted-with content sections, etc. A further class of materialized views and inferred statistics might include statistics cross-referenced with additional content information, such as ratios filtered according to each graphed concept or interaction frequencies aggregated by book section. These summaries, in conjunction with the original data, may then be used to compute characteristics of the student (e.g., engagement, urgency, etc.), as well as characteristics of the content (e.g., difficulty, effectiveness, etc.). In an embodiment, stage 220 is performed by receiver module 152.

At stage 230, a context comprising one or more criteria and/or goals associated with a body of educational content is received. In an embodiment, a context comprises a set of criteria to be used when determining and providing a recommendation. Several non-limiting examples of criteria may include one or more types of content (e.g., text, audio, image, video, etc.), one or more types of evaluations (e.g., challenge, quiz, exam, etc.), one or more items, one or more concepts, one or more chapters, and one or more goals (e.g., a final exam, weekly homework, one or more conceptual goals, items in an assignment, assignment due dates, prerequisites, etc.).

Such criteria also may include weightings, coefficients, priorities, or other information to provide further detail regarding a requested recommendation. In one example, the criteria may be used by a recommendation engine to focus a recommendation on specific criteria and to weigh factors according to greater or lesser importance. In an embodiment, stage 230 is performed by receiver module 152.

At stage 240, a list of modules from the body of educational content is generated based on the data describing the user's interaction with the body of education content in view of the context. In an embodiment, the list of modules is generated using a factored ranker, which is not rule-based, but instead computes a recommendation value for each of one or more modules in a piece of content based on one or more mathematical models. In one example, computation from each of the one or more mathematical models may be decomposed and implemented as one or more components or subcomponents that produce scores that serve as computational input for one or more other components within the model, within other models, and across various factored ranker topologies.

In one embodiment, the factored ranker generates a list of one or more recommended modules from one or more pieces of content using a ranker topology. A ranker topology is generally a series of loosely coupled components associated with models that each perform computations and deliver computed information and values downstream to other components to produce scores, ratings, and/or other results. In one example, a ranker topology evaluates one or more course graphs, student events, and educational contexts to provide a personalized educational content recommendation for a student.

In an embodiment, a factored ranker topology calculates a set of one or more scores for each module in a piece of content. Each of the scores for a content module may be based on a different mathematical model pertaining to aspects of providing educational content recommendations. In one example, the factored ranker calculates a score for models, which may include an instruction model, a preparedness model, an assessment model, an engagement model, and an urgency model, etc.

In an example, the factored ranker then may combine scores calculated for one or more of the models into a combined score for a specific content module. The combined scores for each respective content module then may be used to rank the modules when providing a recommendation. For example, the factored ranker may provide an ordered set of modules as a recommendation based on the combined score. The ordered set of modules may contain one or more modules, may be based on any number of modules in a piece of content, and may be filtered on criteria such as one or more minimum thresholds (e.g., for a combined score, one or more model scores, a module count, etc.).

In an embodiment, an instruction model may be used when determining recommendations for educational content. An instruction model may represent a measurement of what a module is likely to teach a student, for example, with respect to a piece of content or a course. In one example, an instruction model may take into consideration what a student currently knows about a concept, how prepared a student is to learn a concept, how likely a module is to teach a student what they need to know, and relevance of the module in relation to an entire course.

In an example, an instruction model may rely on a preparedness model, which also could exist independently from the instruction model. Preparedness generally describes the degree to which a student is ready to understand a particular concept. Preparedness may be based in whole or in part on a student's proficiency with respect to prerequisites of a concept in view of how important each prerequisite is to learning or understanding the concept. In one example, a preparedness model may rely on the probability that a student will respond correctly to a randomly selected item from a pool of items testing the particular concept.

In an embodiment, an assessment model may be used to determine what a student knows and/or what the student has learned. In an example, an assessment value also may indicate the extent to which a module can be used to assess what a student actually knows about the concepts taught by a particular course.

In an embodiment, an engagement model may be used to determine how engaging a module is likely to be for a student. For example, a student may prefer one type of content or presentation over another (e.g., text, audio, video, images, games, etc.). A particular student also may find content that they have previously seen to be more or less engaging then new content. A student also may find certain kinds of content engaging, such as content that is more challenging or less challenging than on average.

In an example, calculations used in engagement model may relate to a student's preferred mode or modes of learning, past student performance with respect to various types of content, length of a module, rhythm of a module, observations about a student's previous interactions with various types of content, length of a current session, engagement qualities of a piece of content, actual engagement of other students having a similar student profile, etc.

In an embodiment, an urgency model may be used to determine how important a module is to helping a student achieve educational goals. For example, a score of an urgency model may indicate the degree to which completing a module will advance a student toward a goal, taking into account a period of time in which the goal should be achieved, and factoring in other dates or deadlines associated with other goals.

In an example, urgency may be based on each potential path a student could traverse through a course graph. In one example, urgency may be factored into a preparedness model to help ensure that a student is adequately prepared in a given amount of time. In another example, urgency may be factored into an instruction model to help measure how much learning a particular concept will advance a student toward a goal in a given amount of time.

In certain implementations, one or more of the techniques described herein can further utilize or otherwise account for information/data (e.g., historical information) pertaining to one topic, subject, etc., in order to generate a list of modules that pertain to another topic, subject, etc. For example, data received (e.g., at stage 220) which describes or otherwise reflects the manner in which a particular user interacted with math content can be utilized or otherwise accounted for in generating a list of modules for the user/student that pertain to chemistry content. In doing so, appropriate modules pertaining to one subject can be identified for a user even in a scenario in which historical data (with respect to that user) for that subject may not be available. By way of further example, data received (e.g., at stage 220) which describes or otherwise reflects the manner in which other users interacted with math content can be utilized or otherwise accounted for in generating a list of modules for a particular user (which, for example, shares one or more characteristics with the other users) that pertain to chemistry content.

In an embodiment, each of the components of the models are pure functions having a set of finite inputs that map to an estimated quantity or value. A score for one or more models may be computed for each module in a piece of content. The aggregate score of the models computed for each module may be used to prioritize the modules according to importance when providing a recommendation for educational content. In an embodiment, stage 240 is performed by recommendation generator 156.

At stage 250, the generated list of modules is provided to interested party. In one example, a generated list of one or more modules is sent to a content provider in response to a request. In another example, the generated list of modules is stored in a local or remote database that may be accessed by a content provider or other interested party. Further, the generated list of modules may be stored for future analysis and/or archived for preservation purposes. In an embodiment, stage 250 is performed by recommendation provider 158.

Figure 3:
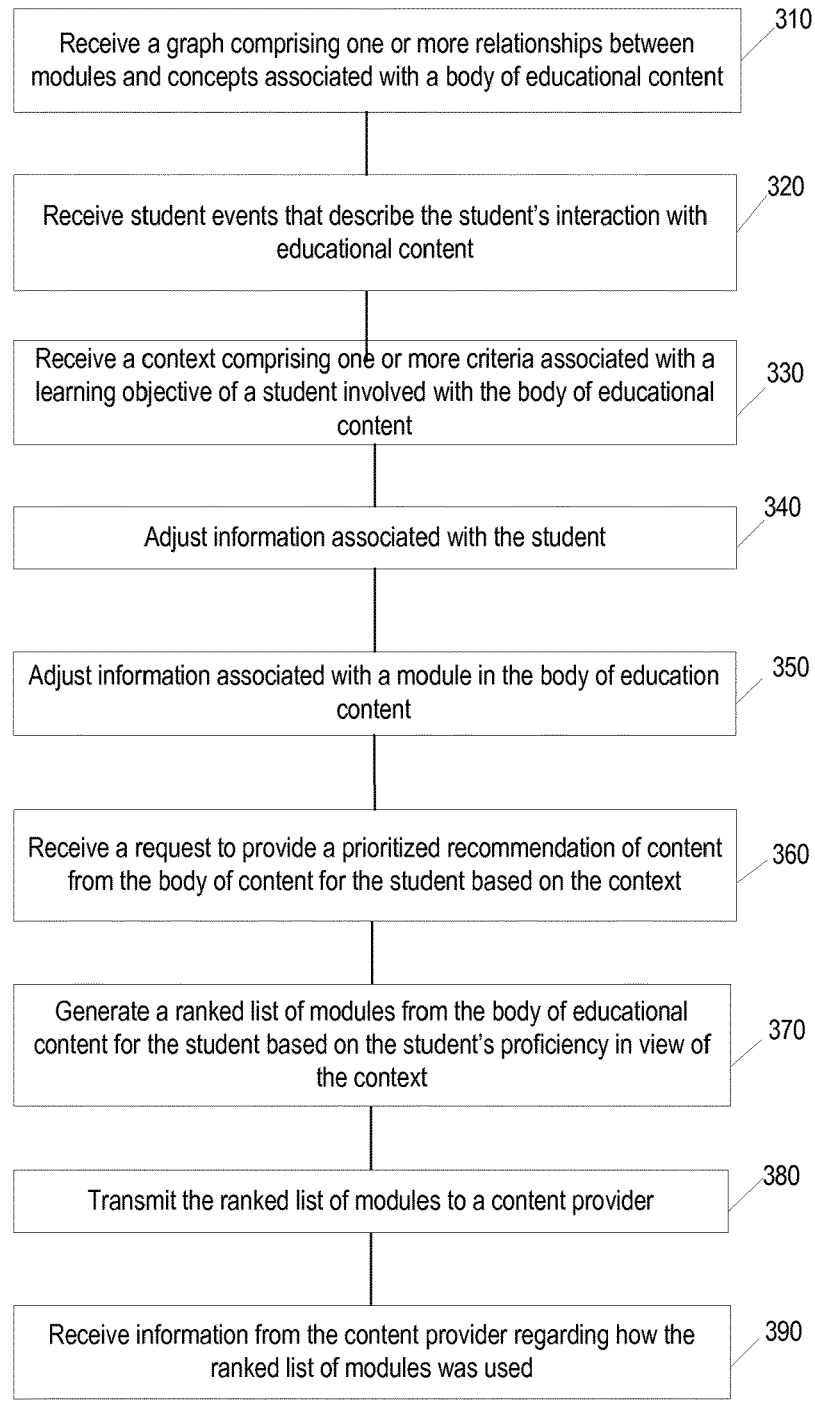
FIG. 3 is a flow diagram illustrating further aspects of providing personalized educational content recommendations, according to an embodiment.

FIG. 3 is a flow diagram illustrating further aspects of providing personalized educational content recommendations, according to an embodiment. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof. In one implementation, the method 300 is performed using content recommendation system 150 of FIG. 1 while in some other implementations, one or more blocks or stages of method 300 may be performed by one or more other elements, machines, and/or systems. Moreover, in certain implementations method 300 may be used to provide personalized educational content recommendations on a very large scale (e.g., across millions of users in a high transaction volume environment).

For simplicity of explanation, methods are depicted and described as a series of acts, operations, and/or stages. However, acts, operations, and/or stages in accordance with this disclosure can occur in various orders and/or concurrently, and with other acts, operations, and/or stages not presented and described herein. Furthermore, not all illustrated acts, operations, and/or stages may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

At stage 310, a graph comprising one or more relationships between modules and concepts associated with a body of educational content is received. In an embodiment, a course graph comprising modules, concepts, and relationships is received for a piece of content. In one example, the course graph generally represents what can be known about a specific piece of content and possible learning paths a student may traverse. In one embodiment, stage 310 is performed by receiver module 152.

At stage 320, student events describing student interactions with educational content are received. In one embodiment, an item response historian component receives a stream of data representing student interactions in a ranker topology implementation. The item response historian may analyze the stream of student interactions and maintain a compressed history of data for each student, which may be referenced and used when providing recommendations, adjusting information about the student, or adjusting information about the content.

For example, the item response historian may determine whether information is relevant to maintaining a student history and may update the student's history or streamlined history based on incoming student event information for the student. In one example, item response historian publishes updated student histories into a ranker topology where the data is then distributed to one or more components that are configured to listen for such information (i.e., a dependent component downstream in the topology). Thus, scoring models may receive a set of reduced event streams managed by the item response historian. In an example, item response historian may filter observations using a median filter or other statistical methods to ensure quality of the data used to provide educational content recommendations. In one embodiment, stage 320 is performed by receiver module 152.

At stage 330, a context comprising one or more criteria associated with a learning objective of a student involved with the body of educational content is received. In an embodiment, the context is specified and received from a party such as a content partner. A context may be analyzed to determine what types of information need to be taken into consideration when determining and providing a recommendation. (e.g., a two-day study period vs. a two week study period for the same content). In one example, the content recommendation system 150 may use one or more specific recommendation topologies, one or more different mathematical models, and/or one or more different components in a topology based on recommendation criteria provided with a context. In one embodiment, stage 330 is performed by receiver module 152.

At stage 340, information associated with a student is adjusted. In an embodiment, a consolidated history of student information is updated based on observed student events. For example, properties, attributes, observed student performance relating to a concept, estimated student performance relating to a concept, and other information about a student may be updated when needed or when possible. In one example, student information is updated to reflect knowledge a student has acquired over time as determined by the student's performance when interacting with modules. In another example, student information may be updated to more accurately reflect a student's understanding of a concept based on student events involving modules that assess mastery of a concept. In one embodiment, stage 340 is performed by attribute adjuster 154.

At stage 350, information associated with a module in the body of educational content is adjusted. In an embodiment, an attribute, property, or a relationship involving a module is updated based on analyzing student events associated with the module or related modules. For example, student events may indicate that a module teaches a concept more or less effectively, or is more or less difficult than previously anticipated or determined. In one example, an adaptive learning environment updates information pertaining to a module, such as effectiveness of the module, based on one or more thresholds. In an example, a course graph comprising the module may be updated to reflect the module's relationship to other modules and concepts in a course graph (and across other course graphs). Thus, information that is known or estimated about a piece of content may be continually improved based on numerous, continued student interactions with associated modules over time. In one embodiment, stage 350 is performed by attribute adjuster 154.

Moreover, in certain implementations the body of content itself can be modified or adjusted. For example, based on/in response to one or more student events or any other such feedback or determination that reflects that one or more elements, segments, sections, etc. of a body of content is not effective in teaching or otherwise conveying a particular concept, specific information, etc., such elements, segments, sections, etc., can be adjusted (e.g., by removing the identified content, adjusting its placement/relationships with other content, editing or reformulating it, etc.).

At stage 360, a request is received to provide a personalized recommendation of content in a body of educational content for a student based on a context. In an embodiment, a content provider requests a recommendation for content based on what is known about the content, the student's readiness to learn the material, and constraints affecting or relating to the material. In one embodiment, stage 360 is performed by receiver module 152.

At stage 370, a ranked list of modules from the body of educational content are generated for the student based on the student's proficiency in view of the context. In one embodiment, a ranker topology is implemented using an actor-based framework. The actor-based framework may receive an incoming stream of data, process the data using various loosely coupled components relating to mathematical models, and generate a recommendation comprising a personalized list of modules recommended for a student. Thus, the actor-based framework may be implemented as a service that receives information, determines how to process the information, and uses a set of loosely coupled components that allow data to flow down various paths at different computational and processing speeds. Such an actor-based framework generally may be applied across a variety of various disciplines unrelated to the field of education and providing educational recommendations (e.g., predicting weather, anticipating traffic jams, determining the spread of a virus, correlating crime patterns and rates, etc.).

In an example, an actor-based framework manages propagation of information from one or more upstream components that publish information to one or more other downstream components, which have subscribed to receive the information. In one example, components/actors in a topology may publish and subscribe to other actors. Components/actors also may publish and subscribe conditionally based on parameters such as context, subject matter, etc. The actor-based framework may manage publication and distribution of published information between components/actors. Thus, an actor-based framework may manage the exchange of data between a set of loosely coupled components to achieve a result.

In one example, an actor-based framework is a way of structuring and facilitating communication between different components (e.g., code units). Exchange of data may be performed in a standard and organized way, regardless of performance properties of any individual component. For example, some computations may be performed very quickly while more complex computations may take longer. The actor-based framework allows various types of computations to be initiated and performed at different speeds.

In one embodiment, the actor-based framework does not require actors/components to communicate directly with one another. Instead, multiple actors/components may interact without knowing the existence of one another. For example, the actor-based framework may allow an actor/component to publish information to a key (e.g., a unique value), which is then persisted in a data store. Other actor/components then may be configured or automatically subscribe to the key, which is managed by the actor-based framework.

When information is published to the key, the actor-based framework receives notification of the publication, persists the published information for stability, determines actor/components that subscribe to the key, sets a dirty state for the actors/components that subscribe to the key, and delivers or routes the published information to those actors/components. The published information may be resent when necessary, for example, in the event of system disruptions, lost messages, etc.

In an embodiment, student event streams and other information are received on a regular basis. In one example, complex analytical processing for one or more components and/or models may exceed a period of time allotted for providing a recommendation. In such examples, a last known observation or estimation of values may be used to provide a best available recommendation at a given point in time. For example, a better recommendation may exist in sometime in the future, but a timely recommendation may be provided based on the best available information. In an example, a revised or updated recommendation may be provided to a content provider when new information becomes available or within a certain timeframe of an initial request.

A ranker topology may comprise a set of factorized or decomposed calculations based on one or more mathematical models. Each of the components may be used to perform computations and analysis needed to generate recommendations or other results. In one embodiment, factorized components in a ranker topology are processed in parallel. For example, one or more paths of an actor-based ranker topology may be processed in parallel. Further, each component of an actor-based ranker topology also may be processed in parallel. In one embodiment, stage 370 is performed by recommendation generator 156.

At stage 380, the ranked list of modules is transmitted to a content provider. In an embodiment, the ranked list of modules is transmitted over a network to a content provider that provides the educational content to users. In one example, the ranked list of modules may be transmitted or sent to a content provider immediately or shortly after their determination. In another example, the ranked list of modules may be provided on request or in a separate batch job (e.g., at a scheduled time). In one embodiment, stage 380 is performed by recommendation generator recommendation provider 158.

At stage 390, information about how a content provider has used the ranked list of modules is received. In an embodiment, the content provider that serves the educational content to users sends information about how a user recommendation was used when delivering or providing the content to the user. For example, the content provider may ignore the recommendation, utilize the recommendation in one or more ways, provide a list of selectable options to the user, etc. In one embodiment, stage 390 is performed by receiver module 152.

It should be noted that while the technologies described herein are illustrated primarily with respect to education content, such characterization is intended only by way of example and in the interests of clarity and brevity. However, it should be understood that the described technologies can also be implemented with respect to any other type of content (e.g., recreational content, gaming content, etc.), in any number of additional or alternative settings or contexts, and/or towards any number of additional objectives.

Figure 4:
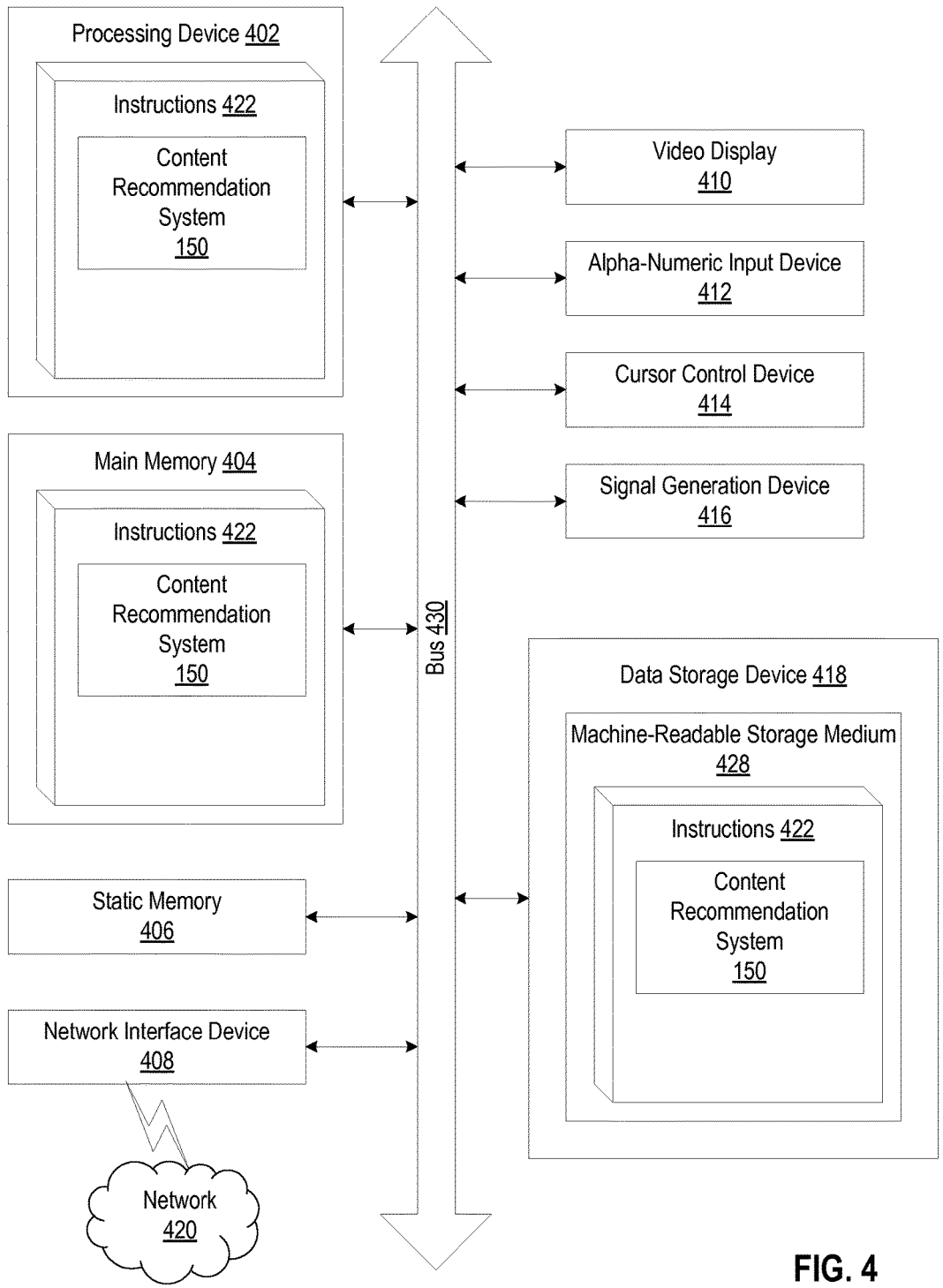
FIG. 4 is a block diagram of an exemplary computer system that may perform one or more of the operations described herein.

FIG. 4 illustrates a diagram of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 422 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a computer-readable storage medium 428 on which is stored one or more sets of instructions 422 (e.g., software) embodying any one or more of the methodologies or functions described herein. The instructions 422 may also reside, completely or at least partially, within the main memory 404 and/or within the processor 402 during execution thereof by the computer system 400, the main memory 404 and the processor 402 also constituting computer-readable storage media. The instructions 422 may further be transmitted or received over a network 420 via the network interface device 408.

In one embodiment, the instructions 422 include instructions for an educational content recommendation system (e.g., content recommendation system 150 of FIG. 1) and/or a software library containing methods that call an educational content recommendation system. While the computer-readable storage medium 428 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "computing", "comparing", "applying", "creating", "ranking," "classifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the disclosure should therefore be determined with reference to the appended claims, along with the full scope of equivalents to which such claims are entitled.

What is claimed is:

1. A method comprising:
   receiving, by a processor, information describing a body of content;
   receiving, by the processor, data describing an interaction of a user with one or more elements of the body of content;
   receiving, by the processor, a context comprising one or more criteria associated with the body of content;
   providing a ranker topology implemented using an actor-based framework that outputs a score for each of a plurality of modules from the body of content, wherein the actor-based framework comprises a plurality of actors that are each a code unit, wherein at least one of the plurality of actors subscribes to one or more pieces of information from another of the plurality of actors, performs one or more calculations, and publishes one or more pieces of information to still another of the plurality of actors, and wherein the one or more calculations produce information that contributes to the score output by the ranker topology for each of the plurality of modules from the body of content;
   generating, by the processor, a ranked list of modules from the body of content based on the data describing the interaction of the user with the one or more elements of the body of content in view of the context using the ranker topology; and
   providing, by the processor, the generated ranked list of modules to an interested party.

2. The method of claim 1, wherein the data describing the interaction of the user with the one or more elements of the body of content is generated by the interaction of the user with the one or more elements of the body of content.

3. The method of claim 2, wherein the list of modules is generated from the body of content based on the context in view of information about the user.

4. The method of claim 1, further comprising:
   receiving, by the processor, a request to provide a personalized list of modules for a user from the body of content based on one or more computed characteristics of the user with respect to one or more aspects of the body of content.

5. The method of claim 1, further comprising:
   receiving, by the processor, at least one event comprising information about a user interaction with a module in the body of content.

6. The method of claim 5, further comprising:
   adjusting, by the processor, at least one attribute associated with the user based on the event.

7. The method of claim 5, further comprising:
   adjusting, by the processor, at least one attribute associated with at least one of the modules in the body of content based on the event.

8. The method of claim 1, wherein the information describing the body of content comprises one or more relationships between at least two modules in the body of content.

9. The method of claim 1, wherein the information describing the body of content comprises one or more relationships between at least two concepts associated with the body of content.

10. The method of claim 1, wherein the information describing the body of content is a graph comprising one or more relationships between at least one module and at least one concept that are associated with the body of content.

11. The method of claim 1, wherein the interested party is a party providing one or more modules in the body of content to a user.

12. The method of claim 11, further comprising:
    receiving, by the processor, information from the content provider indicating whether the generated list of modules was used to determine the one or more modules provided to the user.

13. The method of claim 1, wherein the providing comprises:
    transmitting, by the processor, the generated list of modules to the interested party.

14. The method of claim 1, further comprising adjusting the body of content based on one or more interactions with one or more elements of the body of content.

15. The method of claim 14, wherein the adjusting the body of content comprises at least one of: removing one or more elements from the body of content, adjusting a placement of one or more elements within the body of content, modifying one or more elements within the body of content, or reformulating one or more elements within the body of content.

16. The method of claim 1, wherein the body of content comprises a first body of content and wherein generating the ranked list of modules comprises generating the ranked list of modules from the first body of content based on data describing an interaction of the user with one or more elements of a second body of content.

17. The method of claim 16, wherein the first body of content comprises content pertaining to a first subject and the second body of content comprises content pertaining to a second subject.

18. A system, comprising:
    a memory; and
    a processor coupled to the memory configured to:
       receive information describing a body of content;
       receive data that describes an interaction of a user with one or more elements of the body of content;
       receive a context comprising one or more criteria associated with the content;
       provide a ranker topology implemented using an actor-based framework that outputs a score for each of a plurality of modules from the body of content, wherein the actor-based framework comprises a plurality of actors that are each a code unit, wherein at least one of the plurality of actors subscribes to one or more pieces of information from another of the plurality of actors, performs one or more calculations, and publishes one or more pieces of information to still another of the plurality of actors, and wherein the one or more calculations produce information that contributes to the score output by the ranker topology for each of the plurality of modules from the body of content;
       generate a ranked list of modules from the body of content based on the data that describes the interaction of the user with the one or more elements of the body of content in view of the context using the ranker topology; and provide the generated ranked list of modules to an interested party.

19. The system of claim 18, wherein to generate is to: compute a score for each of a plurality of modules from the body of content based on the context.

20. The system of claim 18, wherein to generate is to: rank a plurality of modules from the body of content using a score computed for each of a plurality of modules.

21. The system of claim 18, wherein to generate is to: rank a plurality of modules from the body of content using a score computed for each of a plurality of modules in view of information about the user.

22. A non-transitory computer readable medium having instructions stored thereon that, when executed by a processor, cause the processor to perform operations comprising:
receiving, by the processor, information describing a first body of content, the information describing the first body of content comprising one or more relationships between a module and concept associated with the first body of content;
receiving, by the processor, data describing an interaction of a user with one or more elements of the first body of content;
receiving, by the processor, a context comprising one or more criteria associated with the content;
providing a ranker topology implemented using an actor-based framework that outputs a score for each of a plurality of modules from the body of content, wherein the actor-based framework comprises a plurality of actors that are each a code unit, wherein at least one of the plurality of actors subscribes to one or more pieces of information from another of the plurality of actors, performs one or more calculations, and publishes one or more pieces of information to still another of the plurality of actors, and wherein the one or more calculations produce information that contributes to the score output by the ranker topology for each of the plurality of modules from the body of content;
generating, by the processor, a ranked list of modules form the first body of content based on the data describing the interaction of the user with one or more elements of the first body of content in view of the context and information pertaining to an interaction of the user with a second body of content using the ranker topology;
providing, by the processor, the generated ranked list of modules to a party associated with one or more modules from the generated ranked list of modules; and
adjusting the first body of content based on the data describing the interaction of the user with the one or more elements of the first body of content.

* * * * *